Dec. 27, 1949   G. C. WEINGARDT   2,492,248
ELECTRIC SPACE HEATER
Filed Jan. 31, 1947   2 Sheets-Sheet 1
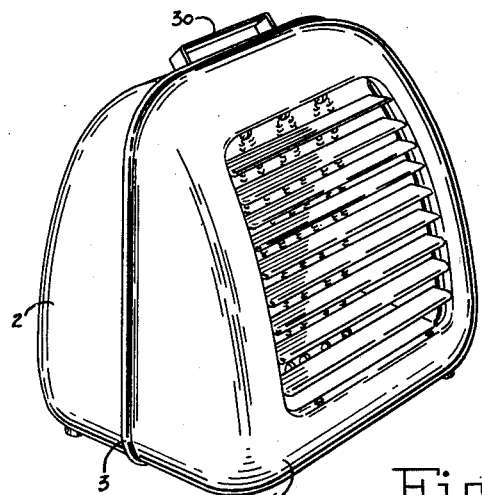
Fig. I
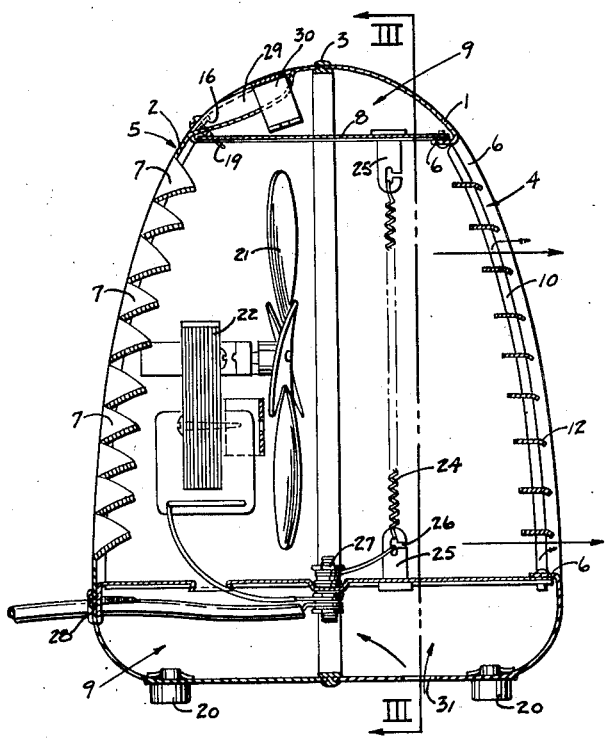
Fig. II
INVENTOR.
GEORGE C. WEINGARDT
BY
Marshall and Marshall
ATTORNEYS Dec. 27, 1949     G. C. WEINGARDT     2,492,248
ELECTRIC SPACE HEATER
Filed Jan. 31, 1947     2 Sheets-Sheet 2
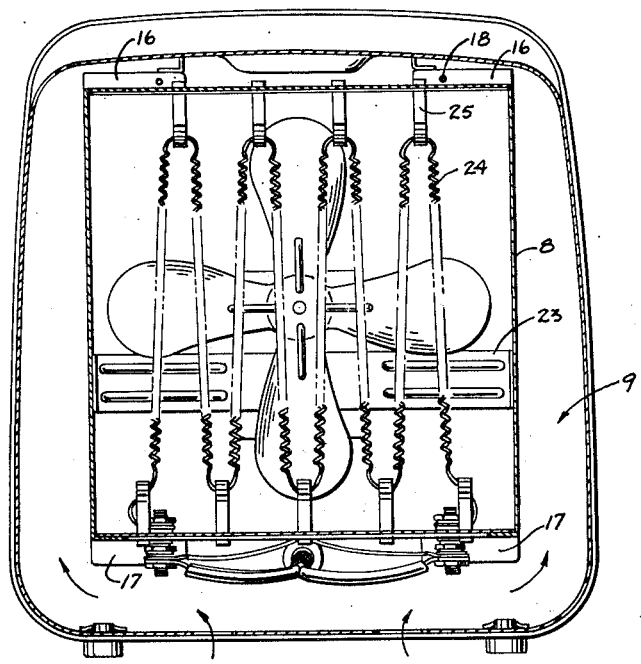
Fig. III
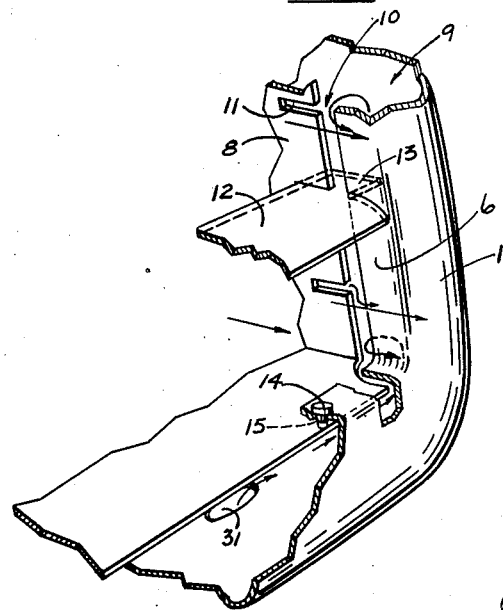
Fig. IV
INVENTOR.
GEORGE C. WEINGARDT
BY
Marshall and Marshall
ATTORNEYS Patented Dec. 27, 1949

2,492,248

UNITED STATES PATENT OFFICE 2,492,248

ELECTRIC SPACE HEATER

George C. Weingardt, Toledo, Ohio, assignor to The Swartzbaugh Manufacturing Company, Toledo, Ohio, a corporation of Ohio Application January 31, 1947, Serial No. 725,702

8 Claims. (Cl. 219—39)

1

This invention relates to electrical space heaters and, more particularly, to portable electrical heaters having electrical heating coils and electrically driven fans to circulate the air heated by the coils.

It is the principal object of this invention to provide an electrical space heater which is simple to construct and which delivers a large volume of heated air without becoming dangerously hot or even hot enough to be uncomfortable if touched by human hands.

It is a further object of this invention to provide a compact, easily cleaned electrical space heater which is of light weight and small size and thus is portable and occupies little space when stored.

It is yet another object of this invention to provide an electrical space heater which can be fabricated at low cost and is simple to assemble.

It is a still further object of this invention to provide a casing for an electrical space heater which is formed from simple parts, easy to assemble and neat and compact in appearance.

More specific objects and advantages will be apparent from the drawings, in which:

Figure I is a perspective view of an electrical space heater embodying the invention.

Figure II is a vertical sectional view on a slightly enlarged scale of the heater shown in Figure I.

Figure III is a transverse vertical sectional view taken substantially on the line III—III of Figure II.

Figure IV is an enlarged fragmentary detail view in perspective showing details of the assembly and construction of a heater embodying the invention.

An electric heater embodying the invention may consist of a pair of substantially identically formed casing elements 1 and 2. Each of the casing elements 1 and 2 forms half of the completed casing of the heater. The two casing elements 1 and 2 have outer contours such that when mated and assembled the exterior of the heater casing presents a smooth continuous appearance. The casing formed by the two elements 1 and 2 parts at its transverse vertical center plane where the edges of the two casing elements 1 and 2 fit between arms of a substantially H-shaped trim band 3. The outer bar of the H is shaped to present a pleasingly curved exterior appearance. Each of the casing elements 1 and 2 is provided with an opening (4 and 5, respectively) extending substantially across its main wall and thus, when the two casing elements 1 and 2 are assembled, across the main front and back walls of the heater

2 casing. The opening 4 in the front casing element 1 is open and has a short return lip 6 extending around its four sides. The opening 5 in the casing element 2 is grilled by a plurality of formed louvers 7 which are cut and pressed inwardly from the same sheet of metal that forms the remainder of the casing element 2.

The heater has an inner box-like casing 8 (see also Figures III and IV) which has an open front and back, two flat sides and a substantially flat top and bottom. The inner box-like casing 8 is of transverse cross section smaller than that of the casing elements 1 and 2. This provides an open air space 9 (see Figures II and III) extending around the inner box-like casing 8 at its sides, top and bottom and forming, between the exterior of the box-like casing 8 and the side, top and bottom walls of the outer casing elements 1 and 2, an insulating air space between the inner casing 8 and the outer casing formed by the outer casing elements 1 and 2. The inner box-like casing 8 is of such size that the edges of its open front and back substantially match with the edges of the openings 4 and 5 in the casing elements 1 and 2 and form with the openings 4 and 5 an open air passageway extending through the assembled heater.

The forward edges of the side walls of the box-like casing 8 (see Figure IV in particular) are cut back and spaced slightly from the innermost edge of the return lip 6 to form a vertically extending narrow aperture 10 leading from the insulated air space 9 into the air passageway through the heater. These forward edges of the sides of the box-like casing 8 also have a plurality of horizontally extending notches 11 which receive the ends of a series of formed grill bars 12 each having a tab 13 at each end. The two tabs 13 on each of the grill bars 12 extend through an associated pair of notches 11 formed in opposite sides of the inner casing 8 to position and hold the grill bar 12 in place. The edge of each of the tabs 13 engages with the rearmost edge of the return lip 6 so that each of the grill bars 12 is held in place in the notches 11 by the edges of the lip 6 of the casing element 1.

The forward edges of the top and bottom of the inner casing 8 extend above and beneath respectively the lip 6 at the top and bottom of the opening 4. Rivets 14 are fixed in the lip 6 extending through the lip 6 and are engageable with punched holes 15 in the top and bottom forward edges of the casing 8. The casing 8 is secured to the casing element 1 by springing its top and bottom up or down and over the associated portions of the lip 6 engaging the ends of the rivets 14 in the holes 15. This latches the inner box-like casing 8 to the front casing element 1 and assembles these two parts in their proper relationship also holding the grill bars 12 in place in their notches 11 and extending across the opening 4.

The inner box-like casing 8 has a pair of upwardly turned flanges 16 and a pair of similar downwardly turned flanges 17 which lie against the inner surface of the rear casing element 2 adjacent the upper and lower edges of the opening 5. Each of the flanges 16 and 17 has a small hole 18 into which is threaded a securing screw 19 the head of which lies on the exterior of the rear casing element 2.

The heater casing is assembled from the front and rear mating casing elements 1 and 2, the trim band 3, the inner box-like casing 8 and the formed grill bars 12, by inserting the grill bars 12 in their notches 11 and engaging the forward edges of the casing 8 with the rivets 14 to lock the grill bars 12 in place and then matching the two joining edges of the casing elements 1 and 2 between the arms of the trim band 3 and tightening the securing screws 19 to draw the two casing elements 1 and 2 together and fix the parts in assembled relationship.

Each of the casing elements 1 and 2 is equipped with a pair of feet 20 which may be retained in any well known manner and on which the heater rests.

The inner box-like casing 8 not only serves to hold the assembled heater casing together and to form the insulating air space around the air passageway of the heater but also to support a small motor driven fan 21 and its motor 22 which are mounted on a cross bar 23 secured to the inner side walls of the casing 8 near the rear of the heater. The inner casing 8 also carries a heating coil 24 which is supported in several insulators 25. Each of the insulators 25 is substantially T-shaped and extends through a slot cut in the top or bottom of the inner casing 8 with the main stem of the T extending inwardly. A notch 26 is formed in each of the ends of the main bars of the T's and the heating coil 24 is hooked through the notches in the insulators 25 serving both to support the heating coil and to hold the insulators in position. The ends of the heating coil 24 are attached to binding posts 27 secured to the bottom of the inner casing 8 to which the motor leads and the power leads also are secured, the power line being carried out of the heater casing through an insulated opening 28.

At the upper front portion of the rear casing element 2 there is formed a depression 29 over which extends the cross bar of a C-shaped handle 30, the arms of the C extending through slots in the casing element 2 and being turned sideways to catch beneath the metal adjacent the slots when the handle is extended to lift the heater. The depression 29 permits one's fingers to be inserted beneath the handle cross bar when it is collapsed. Several apertures 31 are punched through the bottom of the casing elements 1 or 2 or both to form inlet apertures for outside air to enter the insulating air space 9.

When the motor 22 and heating coil 24 are energized rotation of the fan 21 draws air through the louvered opening 5 into the air passageway in the heater and forces it past the heating coil 24 and out the grilled opening 4 at the front of the heater. Radiation from the heating coil 24 heats the air as it is blown through the heater by the fan 21 but also heats the surrounding casing 8. If the casing 8 were not spaced from the outer casing elements 1 and 2, or if the motor and heating coil were supported directly from the outer casing elements 1 and 2, these outer casing elements would shortly become uncomfortably warm. The air in the insulating air space 9, however, insulates the inner casing 8 from the outer casing elements 1 and 2. As the air forced through the air passageway in the center of the heater by the fan 21 passes out the opening 4 (as shown by the straight arrows in Figures II and IV) it moves past the vertical apertures 10 and, by what might be termed "Venturi action" exhausts air from the insulating air space 9 thus drawing air into the insulating air space 9 through the inlet apertures 31. This auxiliary flow of air produced by the passage of the heated air across the apertures 10 provides sufficient circulation through the insulating air space 9 to prevent the air in such space from becoming excessively heated and from finally heating the outer casing elements 1 and 2 to an uncomfortable extent.

The embodiment of the invention which has been described may be modified to meet various requirements.

Having described the invention, I claim:

1. A casing for an electric space heater comprising, in combination, an inner box-like fan and heater coil mounting casing having an open front and back, a pair of similar mating outer casing elements, each forming one half of the assembled casing and having continuous exterior contours, each of said elements having an opening in its main wall, the open front and back of said inner casing substantially matching said openings in said mating casing elements and forming therewith an air passageway through said heater, releasable latching means for securing the front edges of said inner casing to one of said mating casing elements along the edges of the opening therein and releasable latching means for securing the rear edges of said inner casing to the other of said mating casing elements along the edges of the opening therein.

2. A casing for an electric space heater comprising, in combination, an inner box-like fan and heater coil mounting casing having an open front and back, a pair of similar mating outer casing elements, each forming one half of the assembled casing and having continuous exterior contours, each of said elements having an opening in its main wall, the open front and back of said inner casing substantially matching said openings in said mating casing elements and forming therewith an air passageway through said heater, releasable latching means for securing the front edges of said inner casing to one of said mating casing elements along the edges of the opening therein, releasable latching means for securing the rear edges of said inner casing to the other of said mating casing elements along the edges of the opening therein, and a trim band extending between and overlapping the matching edges of said mating casing elements, said trim band being retained in place by its engagement with such edges of said matching casing elements.

3. An electric space heater comprising, in combination, a pair of hollow mating casing elements, each forming substantially half of the casing, an inner insulating box-like casing having an open front and back and being smaller in transverse dimensions than the two mating elements whereby, when said heater is assembled, an insulating air space is provided around the exterior of said inner casing between it and the interior of said casing elements, said inner casing extending between the front and rear walls of said assembled heater, each of said mating casing elements having a grilled opening, said inner casing forming with said grilled openings an air passageway through said heater when assembled, releasable latch means at the edges of the opening in one of said mating casing elements engageable with said inner casing and releasable securing means engageable between the other mating casing element and said inner casing, the engagement of said latch means and said securing means holding said heater casing in assembled condition, and fan and heater means mounted on said inner casing in said air passageway.

4. An electric space heater, comprising, in combination, an outer casing having grilled openings in its front and back walls, an inner box-like casing supported within said outer casing, said inner casing having top, bottom and side walls spaced from the corresponding walls of said outer casing to form an insulating air space therebetween and on open front and back in line with the grilled openings in said outer casing to form an air passageway through said heater, said outer casing having apertures to admit outside air into the insulating air space, there being exhaust apertures from the insulating air space into the exit end of said air passageway, a heating element mounted in said air passageway for forcing air therethrough, the flow of heated air out of said air passageway also acting to exhaust air from said exhaust apertures thereby cooling and ventilating the insulating air space and cooling said outer casing.

5. In an electric space heater, in combination, an outer casing, an inner box-like casing having an open front and back and spaced from the inner walls of said outer casing to provide an insulating air space therebetween above, below and on both sides of said inner casing, grilled openings in the front and back of said outer casing, said inner casing substantially matching the edges of said grilled openings in transverse dimensions and forming therewith an air passageway through said heater, the forward edges of the sides of said inner casing being formed to provide exhaust apertures leading from the insulating air space between said casings to the air passageway through said heater, and a fan and heating coil supported in said air passageway for heating and delivering heated air out of the front opening of said outer casing, the passage of heated air past the exhaust apertures from the insulating air space acting to exhaust air from such space thereby maintaining the outer casing substantially cooler than the inner casing and the air in the passageway.

6. In an electric space heater, in combination, a pair of similar mating casing elements, each forming half of each side wall, top and bottom of the housing for said heater, and the front and rear respectively, each casing element having an opening, said openings being in line from front to back of said heater, an inner casing supported in spaced relation from the side and top walls of said mating casing elements to form an insulating zone between the walls thereof and forming with the openings in said mating casing elements an open air passageway through said heater, the front and rear edges of said inner casing substantially matching all the edges of the opening in the rear mating casing element and the top and bottom edges of the opening in the front mating casing element, a fan and a heater coil supported by said inner casing in the passageway for heating and discharging air out of the opening in the front mating casing element, the front edges of the sides of the inner casing being so formed as to leave small exhaust apertures from the insulating zone into the air passageway just back of the front end of the passageway, releasable means for latching the front edges of the top and bottom of said inner casing to the front mating casing element and releasable securing means for securing the rear edges of said inner casing to the rear mating casing element, there being other apertures through the outer walls of said mating casing elements to permit the ingress of air into the insulating zone around said inner casing when air is exhauted therefrom by the Venturi action of the air moved by the fan past the small exhaust apertures.

7. In an electric space heater, in combination, an outer casing having a front opening of relatively large cross section, an inner box-like open-ended casing having substantially the same cross section as the opening in said casing and matching therewith, there being a plurality of short, substantially parallel slots cut in each of the forward edges of a pair of the sides of said inner casing, each slot in each edge being associated with a slot in the other edge, a plurality of formed louver elements extending across the open end of said inner casing and across the front opening of said outer casing through and between two associated slots, and releasable latch means for securing the edges of the other two sides of said inner casing to corresponding edges of the opening in said outer casing, the edges of the opening in said outer casing being pressed against said louver elements and retaining them in the slots when said casings are assembled and said latch means engaged.

8. A casing for an electric space heater comprising, in combination, a pair of similar hollow mating casing elements, each of said elements having air passageways therethrough, a heating coil, a fan, mounting means for said heating coil and said fan, said mounting means extending between said casing elements, releasable latch means co-acting between one of said elements and said mounting means and releasable securing means co-acting between the other of said elements and said mounting means, said latch means and said securing means acting to hold said casing elements in assembled mating position.

GEORGE C. WEINGARDT.

REFERENCES CITED

The following references are of record in the file of this patent:

UNITED STATES PATENTS

| Number | Name | Date |
|---|---|---|
| 1,914,724 | Johnson | June 20, 1933 |
| 2,050,333 | Jordan | Aug. 11, 1936 |
| 2,274,469 | Booth | Feb. 24, 1942 |